United States Patent [19]

Yamamoto et al.

[11] Patent Number: 4,549,221

[45] Date of Patent: Oct. 22, 1985

[54] VIDEO SIGNAL TRANSMITTING SYSTEM

[75] Inventors: Tadashi Yamamoto; Haruhiko Moriguchi, both of Kanagawa, Japan

[73] Assignee: Fuji Xerox Co., Ltd., Tokyo, Japan

[21] Appl. No.: 458,082

[22] Filed: Jan. 14, 1983

[30] Foreign Application Priority Data

Jan. 20, 1982 [JP] Japan .................................. 57-6129

[51] Int. Cl.[4] ............................................ H04N 1/32

[52] U.S. Cl. .................................... 358/288; 358/257; 358/260

[58] Field of Search ........................ 358/288, 260, 257

[56] References Cited

U.S. PATENT DOCUMENTS 4,153,916 5/1979 Miwa .................................. 358/288

4,367,493 1/1983 Matteson ............................ 358/288

4,386,373 5/1983 Kondo ................................ 358/260

4,409,622 10/1983 Watanabe ........................... 358/288

*Primary Examiner*—Howard W. Britton

*Attorney, Agent, or Firm*—Sughrue, Mion, Zinn, Macpeak and Seas

[57] ABSTRACT

A facsimile communication system in which transmission is carried out in such a manner that, when the time of transmission of the video signals of lines provided by scanning an original is shorter than that determined by a facsimile on the signal receiving side, fill bits are transmitted in succession with the video signals so that the time of transmission of each line is adjusted to that determined by the facsimile on the signal receiving side. The period of time required for the facsimile on the signal receiving side to record video signals per line is discriminated by a facsimile on the signal transmitting side for every line according to the contents of video signals. The period of time thus discriminated is utilized as the time of transmission to transmit the video signals for each line.

4 Claims, 2 Drawing Figures

VIDEO SIGNAL TRANSMITTING SYSTEM

BACKGROUND OF THE INVENTION

This invention relates to a video signal transmitting system for a facsimile communication system, in which video signals read by scanning are transmitted.

In a facsimile communication system, an image is read by sequential scanning (or raster scanning) to be transmitted as video signals in a line format. Therefore, in the system, the recording speed at the signal receiving side is one of the factors which determine the transmission time.

Consider first the case where the facsimile device on the signal receiving side records images according to a thermal recording system. In the thermal recording system, it is necessary to provide a relatively large capacity power source for driving the thermal head. Therefore, in a facsimile device having a relatively small capacity power source, the thermal head is driven in divisional manner according to a rate $B_R$ of printing bits (hereinafter referred to as "black bits", when applicable) included in the video signals of a line (hereinafter referred to as "a black rate $B_R$", when applicable). In such a facsimile, the respective values of black rate $B_R$, the numbers of division for driving the thermal head and the recording times for a line are correlated as indicated in Table 1. The facsimile, in this case, employs a blank line skipping system in which the recording operation is omitted for lines which include no black bits. Therefore, when the black rate $B_R$ is 0%, no data is indicated for the number of division in Table 1.

TABLE 1

| Black rate (%) | Number of division | Recording time per line (msec/line) |
|---|---|---|
| $B_R = 0$ | — | 2.5 |
| $0 < B_R \leqq 25$ | 1 | 5.0 |
| $25 < B_R \leqq 100$ | 4 | 10.0 |

In transmitting video signals to the facsimile on the signal receiving side, heretofore the maximum recording time for a line is employed as the minimum transmission time. For instance in the facsimile of Table 1, 10 msec is employed as the minimum transmission time for transmitting the video signals of each line. This is to avoid the problem where the signal transmitting side transmits video signals before the signal receiving side starts the recording operation. Accordingly, in such a system, when the transmission time of the video signals of a line is shorter than the minimum transmission time, a train of fill bits is inserted in the blank part of the transmission time in transmitting the video signals. However, the system is deficient in that, when the recording time for a line is short, the black rate being low, the transmission time cannot be decreased, i.e., the efficiency of transmission of video signals is low.

SUMMARY OF INVENTION

In view of the foregoing, an object of this invention is to provide a video signal transmitting system in which the recording time of each line on the signal receiving side is set to be the minimum transmission time on the signal transmitting side.

According to the invention, the black rate of each line to be transmitted is discriminated in a facsimile on the signal transmitting side and a minimum transmission time is determined for each line from the relation between the black rate and the recording time in a facsimile on the signal receiving side.

This invention will be described in greater detail by referring to the description of the preferred embodiment and the accompanying drawing.

BRIEF DESCRIPTION OF THE DRAWING

The accompanying drawing explains one preferred embodiment of this invention.

More specifically.

DESCRIPTION OF THE PREFERRED EMBODIMENT

This invention will now be described with reference to its preferred embodiment.

Figure 1:
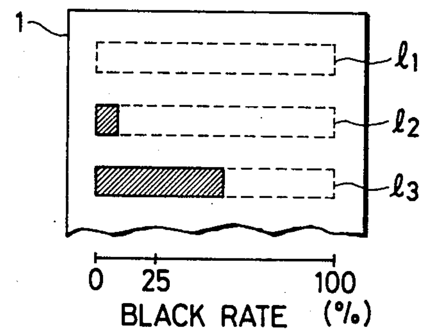
FIG. 1 is an explanatory diagram showing the black rates of lines on the original.

FIG. 1 illustrates the black rates of lines on the original 1, by way of example. No black bits exist on the first line $l_1$ of the original, and therefore the black rate of the first line $l_1$ is 0%. The second line $l_2$ includes a small number of black bits (corresponding to the shaded part), and its black rate is 10%. The third line $l_3$ includes a large number of black bits, and its black rate is 55%. When a facsimile on the signal receiving side performs a recording operation with the numbers of division indicated in Table 1 above, the recording times for the lines $l_1$, $l_2$ and $l_3$ are as listed in Table 2:

TABLE 2

| Line | Recording time (msec/line) |
|---|---|
| $l_1$ | 2.5 |
| $l_2$ | 5.0 |
| $l_3$ | 10.0 |

Figure 2:
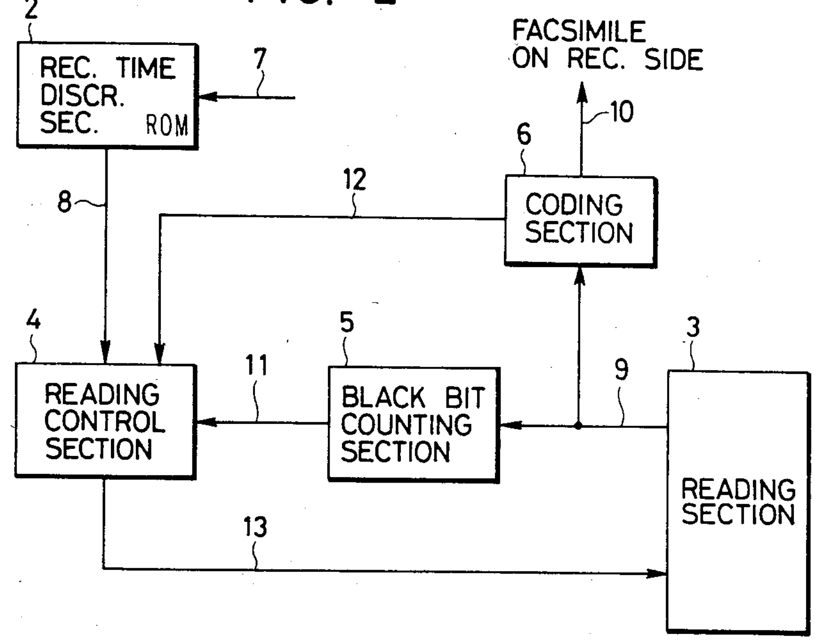
FIG. 2 is a block diagram showing the essential components of a transmitting facsimile.

FIG. 2 shows the essential components of a facsimile device on the signal transmitting side, which is adapted to transmit the video signals of the original in accordance with this invention. The facsimile on the signal transmitting side comprises: a recording time discriminating section 2 for discriminating the recording time of a line of a facsimile on the signal receiving side; a reading control section 4 for initiating instructions for the start of reading a line in a reading section 3; a black bit counting section 5 for counting black bits for the video signal of each line which is outputted by the reading section 3; and an encoding section 6 for encoding the video signal.

When a call mode is established between the transmitting facsimile and the receiving facsimile, the apparatus number of the receiving facsimile is inputted to the recording time discriminating section 2 on line 7. The recording time discriminating section 2 has a ROM (read-only memory) in which the apparatus numbers of various facsimiles and the one-line recording times (minimum transmission times) of those facsimiles have been stored. Therefore, when the apparatus number is inputted, the one-line recording time of the corresponding to that particular facsimile is read out with the apparatus number as address data. The recording time data 8 which is read out as described above is applied to the reading control section 4. In this case, the receiving facsimile has three different recording times as indicated in Table 2. Therefore, in correlation with the black rate $B_R$, these recording times are inputted to the reading control section 4 and are stored therein.

When predetermined initialization procedures, for instance phase synchronization, have been accomplished before transmission of the video signal, the reading section 3 reads the first line $l_1$ with predetermined timing. Consequently, serial video signals 9 for one line which have been binary coded are outputted by the reading section 3. The video signals 9 are applied to the coding section 6, where they are encoded for blank line skipping and are modulated, thus being tranmitted as a facsimile signal 10 to the receiving facsimile.

The video signals 9 are further applied to the black bit counting section 5. The black bit counting section 5 counts the black bits of the first line $l_1$ and applies it as a black rate signal 11 representative of a black rate to the reading control section 4. Upon reception of the black rate signal 11, the reading control section 4 discriminates the recording time corresponding to the black rates and allows a counter incorporated therein to measure the recording time. From Table 2, the recording time of the first line $l_1$ is 2.5 msec. In the reading control section 4, the recording time (2.5 msec) measurement completion signal which is provided by the counter and the coding completion signal 12 which is provided by the encoding section 6 are ANDed. Therefore, when the two signals are applied to the reading control section 4, this section outputs a reading start signal 13, which is applied to the reading section 3. As a result, the reading section 3 starts reading the second line $l_2$ 2.5 msec after the first line $l_1$ is started.

The video signals 9 of the second line $l_2$ are outputted by the reading section 3 and are coded into a facsimile signal 10 by the encoding section 6 which is transmitted to the signal receiving side. At the same time, the black bit counting section 5 counts the black bits of the second line $l_2$, to output a black rate signal 11 representing a black rate 10%. In the reading control section 4, according to the black rate signal 11 thus outputted the recording time of 5.0 msec is measured by the counter. When the facsimile signal 10 which is provided by encoding the video data of the line $l_2$ is transmitted within 5.0 msec, the reading start signal 13 is outputted immediately when the measurement by the counter is accomplished. In this case, the encoding section 6 outputs fill bits in the blank time after encoding the video data has been achieved. When the facsimile signal 10 which is provided by encoding the video data of the line $l_2$ is transmitted for more than 5.0 msec, the reading start signal 13 is outputted immediately when the transmission is accomplished. In this case, the video signals to be encoded are supplied to the encoding section 6 immediately, and therefore no fill bits are inserted.

When the reading start signal 13 is supplied to the reading section 3, this section starts reading the third line $l_3$. The black rate of the third line $l_3$ is 55% and the counter in the reading control section 4 measures the recording time of 10.0 msec. In the encoding section 6, the video signals 9 from the reading section 3 are encoded, and when they are transmitted as the facsimile signal 10 within 10.0 msec, the fill bits are outputted in the blank time. In this case, after 10.0 msec has passed, the next reading start signal 13 is outputted. When the time of transmission is more than 10.0 msec, the next reading start signal 13 is outputted when the transmission is accomplished. Similarly, the video data are transmitted with the minimum transmission time being changed according to the black rate.

As is apparent from the above description, according to the invention, minimum transmission times are provided individually for the lines according to the recording speed at the signal receiving side. Accordingly, for an original having a small black rate, the recording speed can be considerably decreased.

What is claimed is:

1. In a facsimile communication system wherein transmission is carried out such that when the time of transmission of lines of video signals provided by scanning an original image is shorter than that determined by a facsimile on the signal receiving side, fill bits are transmitted in succession with the video signals so that the time of transmission of each line is adjusted to that determined by the facsimile on the signal receiving side, the improvement comprising; means on the signal transmitting side for discriminating a period of time required for the facsimile on the signal receiving side to record video signals per line for each line to be transmitted as a function of its video content and, means to transmit the video signals of each line employing the period of time thus discriminated as the time of transmission, wherein said discriminating means of said signal transmitting side comprises a recording time discriminating section receiving as an input data from said facsimile on the receiving side indicative of its minimum one line recording time, said recroding time discriminating section producing an output of recording time as a function of the video content per line to be transmitted.

2. The system of claim 1, wherein said recording time discriminating section comprises an ROM having stored therein data on the respective minimum recording times for various receiving side facsimiles as a function of equipment identification number.

3. The system of claim 1, wherein said means to transmit comprises a reading section for scanning one line on original to be transmitted at a predetermined timing and producing a video output signal, a coding section for transmission of said video signal and means responsive to said video signal to initiate the scanning of a subsequent line a predetermined period of time following initiation of the scanning of said one line.

4. The system of claim 3, wherein said means to initiate scanning of a subsequent line comprises a reading control section receiving as first input the output from said recording time discriminating section, a counting section for determining the video content of said one line being transmitted and producing as an output a second input to said reading control section indicative of the video content of said one line being transmitted, and said reading control section producing an output to said reading section to commence scanning of a subsequent line a predetermined period following initiation of the scanning of said one line as a function of the recording time for said one line received by said facsimile on the receiving side.

* * * * *